United States Patent [19]

Kinaga et al.

[11] 4,294,468

[45] Oct. 13, 1981

[54] SEATBELT SYSTEM

[75] Inventors: Eiichi Kinaga, Toyota; Mamoru Mori, Okazaki, both of Japan

[73] Assignee: Toyota Jidosha Kogyo Kabushiki Kaisha, Toyota, Japan

[21] Appl. No.: 47,140

[22] Filed: Jun. 8, 1979

[30] Foreign Application Priority Data

Aug. 24, 1978 [JP] Japan ............................ 53-116464[U]

[51] Int. Cl.³ ............................................. B60R 21/02
[52] U.S. Cl. ...................................... 280/807; 297/475
[58] Field of Search ...................... 280/807, 808, 801; 297/475, 481, 482, 483, 474

[56] References Cited

U.S. PATENT DOCUMENTS 4,065,156 12/1977 Tanaka ................................ 280/808

FOREIGN PATENT DOCUMENTS 1531415 11/1978 United Kingdom ................ 280/808

Primary Examiner—John P. Silverstrim
Attorney, Agent, or Firm—Koda and Androlia

[57] ABSTRACT

A seatbelt system including a lap webbing wound up by a retractor and turned back through a lap slip anchor swingably installed on the floor of the vehicle. Furthermore, the seatbelt is of such an arrangement that a center of the retractor and a center of the lap slip anchor are displaced relative to each other and the rotating range of the lap slip anchor is controlled whereby the wind out angle and wind up angle of the lap webbing relative to the retractor is controlled.

2 Claims, 6 Drawing Figures (A)

(B)

SEATBELT SYSTEM

BACKGROUND OF THE INVENTION

1. Field of the Invention

The present invention relates to a seatbelt system for restraining and protecting an occupant of a road vehicle during emergency of the vehicle, and particularly to a seatbelt system in which a lap webbing is smoothly wound into and out from a retractor.

2. Description of the Prior Art

In general, in the case wherein the retractor is embedded in a center pillar provided above the floor surface of the vehicle as in a double-winding-type seatbelt system or the like wherein a lap webbing and a shoulder webbing are wound up by a single retractor one over the other, the lap webbing is adapted to be turned back through a lap slip anchor installed on the floor of the vehicle.

FIG. 1 is an explanatory view showing the conventional seatbelt system of the type described. Incorporated in the center pillar of the vehicle is a retractor 1, into which the lap webbing 2 together with the shoulder webbing 3 are wound up by a biasing force. The lap webbing 2 is turned back through a lap slip anchor 4 swingably installed on the floor of the vehicle, the shoulder webbing 3 is turned back through a shoulder slip anchor 5 swingably installed on the roof of the vehicle, the lap webbing 2 and shoulder webbing 3 are integrally connected at the respective intermediate portions to each other, and a tongue plate 6 is slidably coupled onto the webbing in the longitudinal direction thereof. The tongue plate 6 is engaged with a buckle means not shown so as to be able to install the lap webbing 2 and shoulder webbing 3 around the body of an occupant seated.

However, with the conventional seatbelt system of the type described, although the lap webbing is smoothly wound up by the retractor 1 because the wind-up direction is aligned with the center line of the retractor 1, when the lap webbing 2 is wound out of the retractor 1, the lap slip anchor 4 swings to a great extent in accordance with the pulling direction of the tongue plate 6, whereby the wind-out angle of the lap webbing 2 between the retractor 1 and the lap slip anchor 4 becomes extremely large, thereby making the smooth wind-out difficult.

SUMMARY OF THE INVENTION

Accordingly, it is the general object of the present invention to provide a seatbelt system in which the lap webbing can be smoothly wound out of the retractor.

In keeping with the principles of the present invention, the object is accomplished by a unique seatbelt system wherein a lap webbing wound up by a retractor is turned back through a lap slip anchor swingably installed on the floor of a vehicle. In this system a center of the retractor and a center of the lap slip anchor are displaced relative to each other and a rotational angle control means for the lap slip anchor is provided for controlling the wind-out angle and wind-up angle of the lap webbing relative to the retractor.

BRIEF DESCRIPTION OF THE DRAWINGS

The above-mentioned features and objects of the present invention will become more apparent with reference to the following description, taken in conjunction with the accompanying drawings, wherein like referenced numerals denote like elements, and in which.

DESCRIPTION OF THE PREFERRED EMBODIMENT

Figure 1:
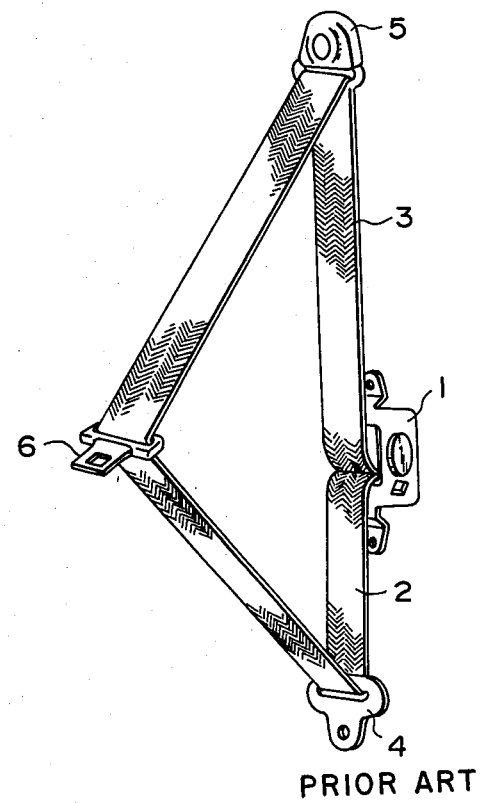
FIG. 1 is an oblique view showing the seatbelt system according to the present invention.
Figure 2:
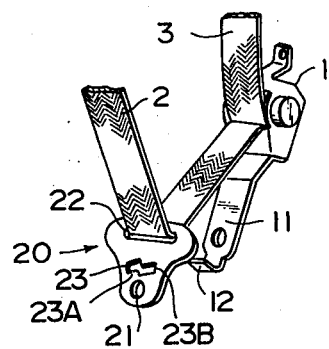
FIG. 2 is an oblique view showing the condition of the seatbelt system in an embodiment of the present invention before the essential portions are assembled together.
Figure 3:
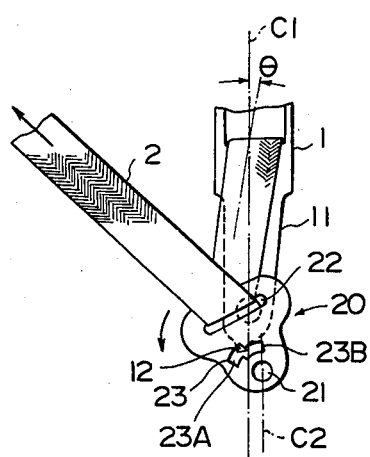
FIG. 3 is a front view showing the wind-out state of the seatbelt according to the invention.
Figure 4:
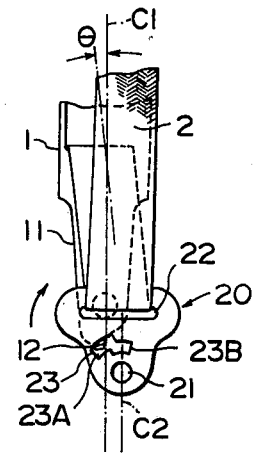
FIG. 4 is a front view showing the wind-up state of the seatbelt according to the invention.
Figure 5:
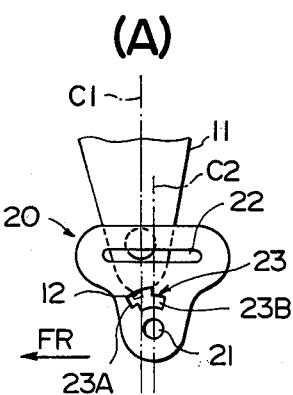
FIG. 5(A) is a front view showing the assembled state on the right hand side.
FIG. 5(B) is a front view showing the assembled state on the left hand side.
Figure 5:
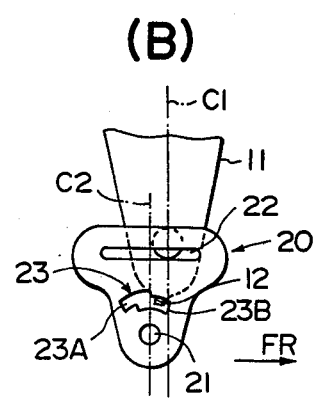

Referring more particularly to the drawings, illustrated in FIG. 2 is an explanatory view showing the condition of the seatbelt system in one embodiment of the present invention before the essential portions are assembled together, and FIGS. 3 and 4 are explanatory views showing the operating conditions thereof after the essential portions are assembled. Extended from the lower end portion of the retractor 1 is an arm 11, the forward end of which is projectingly provided with a turn prevention pawl 12. The turn prevention pawl 12 is disposed at a position shifted from a retractor center C1. Provided at the floor of the vehicle below the retractor 1 is a lap slip anchor 20.

The lap slip anchor 20 is swingably mounted on the floor of the vehicle through an anchor bolt inserted through a mounting hole 21 thereof, and a slip anchor center C2 formed by the mounting hole 21 is disposed at a position horizontally shifted from a retractor center C1. Additionally, said lap slip anchor 20 is provided therein with an insertion hole 22 through which is slidably inserted the lap webbing 2. Further, formed between the mounting hole 21 of the lap slip anchor 20 and the insertion hole 22 is a turn prevention hole 23 to engage with the turn preventive pawl 12. Said turn prevention hole 23 is divided into two portions by steps provided at the center thereof including one turn prevention hole portion 23A at the right hand side (hereinafter referred to as "RH") and the other turn prevention hole portion 23B at the left hand side (hereinafter referred to as "LH").

Description will hereunder be given of the above-described embodiment. When the seated occupant puts on the lap webbing, the lap slip anchor 20 is swung around the mounting hole 21 in the counterclockwise direction as shown in FIG. 3, whereby the turn prevention pawl 12 is engaged with the end of the RH turn prevention hole portion 23A on the step's side, so that the swinging of the lap slip anchor 20 can be stopped. In this condition, the wind-out angle of the lap webbing 2 formed between the retractor 1 and the insertion hole 22 becomes $\theta$ in the clockwise direction relative to the retractor center C1, thus enabling the lap webbing 2 to wind out smoothly.

Furthermore, when the lap webbing is not worn by the seated occupant, the lap slip anchor 20 is swung around the mounting hole 21 in the clockwise direction by the biasing wind-up force of the retractor 1 as shown in FIG. 4, whereby the turn prevention pawl 12 is engaged with the end of the RH turn prevention hole portion 23A opposite the steps, so that the swinging of the lap slip anchor 20 is stopped. In this condition, the wind-up angle of the lap webbing formed between the retractor 1 and the insertion hole 22 becomes $\theta$ in the counterclockwise direction relative to the retractor center C1.

Further, in the above case the lap slip anchor 20 is used with an RH seatbelt system, the turn prevention pawl 12 is arranged to be engaged with the RH turn prevention hole portion 23A as shown in FIGS. 3 through 5(A). When the lap slip anchor 20 is used with an LH seatbelt system, the turn prevention pawl 12 is arranged to engage with the LH turn prevention hole portion 23B as shown in FIG. 5(B).

In the above-described embodiment, the swinging angle of the lap slip anchor 20 is controlled so that the wind-out angle $\theta$ of the lap webbing 2 from the retractor 1 can be restricted, thus enabling the lap webbing 2 to wind out smoothly. Further, the wind-out angle and the wind-up angle of the lap webbing 2 are distributed in opposite directions relative to the retractor center C1, whereby the wind-out angle $\theta$ does not lean toward one side of the retractor center C1, thus enabling the lap webbing to wind out more smoothly.

Furthermore, the turn prevention pawl 12 on the side of the retractor 1 is disposed at a position shifted from the retractor center 1, and the RH turn prevention hole portion 23A and the LH turn prevention hole portion are simultaneously provided in the lap slip anchor 20, thereby enabling it to be easily used for both the RH and LH seatbelt system.

In addition, in the case the lap webbing substantially wound up by the retractor is turned back through the lap slip anchor, the seatbelt system according to the present invention is applicable not only the double-winding type retractor but also the retractor for winding up the lap webbing only.

As has been described so far, according to the present invention, a seatbelt system, wherein a lap webbing wound up by a retractor is turned back through a lap slip anchor swingably installed on the floor of the vehicle, is of such an arrangement that a retractor center and a lap slip anchor center are shifted from each other, the rotating range of the lap slip anchor is controlled, and the wind-out angle and wind-up angle of the lap webbing relative to the retractor is controlled, thus offering such an advantage that the lap webbing can be smoothly wound out from the retractor.

It should be apparent to one skilled in the art that the above described embodiments are merely illustrative of but a few of the many possible specific embodiments of the present invention. Numerous and varied other arrangements can be readily devised by those skilled in the art without departing from the spirit and scope of the invention.

What is claimed is:

1. In a vehicle seatbelt system having a retractor fixedly mounted to said vehicle, a lap slip anchor rotatably mounted to said vehicle subjacent said retractor and a seatbelt wound into and out of said retractor, and slideably received by said slip anchor, the improvement comprising means for preventing said slip anchor from rotating beyond a predetermined range wherein smooth extension and retraction of said seatbelt is assured, said preventing means including a slot in said slip anchor and a pawl fixed relative to said vehicle and extending into said slot, the dimension of said slot relative to said pawl enabling said anchor to rotate relative to said pawl within said range.

2. A seatbelt system according to claim 1, wherein said slot is in the shape of a step whereby said preventing means may be utilized with both left and right hand seatbelt systems.

* * * * *